(12) United States Patent
An et al.

(10) Patent No.: US 11,217,393 B2
(45) Date of Patent: Jan. 4, 2022

(54) CAPACITOR COMPONENT

(71) Applicant: SAMSUNG ELECTRO-MECHANICS CO., LTD., Suwon-si (KR)

(72) Inventors: Sung Kwon An, Suwon-si (KR); Jin Kyung Joo, Suwon-si (KR); Taek Jung Lee, Suwon-si (KR); Min Gon Lee, Suwon-si (KR); Jin Man Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 48 days.

(21) Appl. No.: 16/549,292

(22) Filed: Aug. 23, 2019

(65) Prior Publication Data

US 2020/0194182 A1    Jun. 18, 2020

(30) Foreign Application Priority Data

Dec. 18, 2018   (KR) ......................... 10-2018-0163800

(51) Int. Cl.
*H01G 4/30* (2006.01)
*H01G 4/232* (2006.01)
(Continued)

(52) U.S. Cl.
CPC .......... *H01G 4/2325* (2013.01); *H01G 4/012* (2013.01); *H01G 4/1227* (2013.01); *H01G 4/14* (2013.01); *H01G 4/248* (2013.01); *H01G 4/30* (2013.01)

(58) Field of Classification Search
None
See application file for complete search history.

(56) References Cited

U.S. PATENT DOCUMENTS 10,026,558 B1 *  7/2018  Lee ........................ H01G 4/224
10,325,725 B2 *  6/2019  Seo ........................ H05K 1/111
(Continued)

FOREIGN PATENT DOCUMENTS

KR   10-2005-0071980 A   7/2005
KR   10-2012-0086660 A   8/2012
KR   10-2018-0079807 A   7/2018

*Primary Examiner* — Dion R. Ferguson
(74) *Attorney, Agent, or Firm* — Morgan, Lewis & Bockius LLP

(57) ABSTRACT

A capacitor component includes a body including a dielectric layer and first and second internal electrodes disposed to face each other in a first direction while having the dielectric layer interposed therebetween, and including first and second surfaces, third and fourth surfaces, and fifth and sixth surfaces; first and second margin portions disposed on the fifth and sixth surfaces, respectively; first and second connection parts disposed on the third and fourth surfaces, respectively, and including metal layers connected to the first internal electrode and ceramic layers disposed on the metal layers; a connection electrode penetrating through the body and connected to the second internal electrode; a first external electrode disposed on one surface of the first connection part; a second external electrode disposed on one surface of the second connection part in the first direction; and a third external electrode disposed on the body and connected to the connection electrode.

35 Claims, 16 Drawing Sheets

(51) Int. Cl.
*H01G 4/14* (2006.01)
*H01G 4/248* (2006.01)
*H01G 4/12* (2006.01)
*H01G 4/012* (2006.01)

(56) References Cited

U.S. PATENT DOCUMENTS

| | | | |
|---|---|---|---|
| 2002/0101702 A1* | 8/2002 | Makl, Jr. | H01G 4/232 |
| | | | 361/306.3 |
| 2007/0205514 A1* | 9/2007 | Togashi | H01G 4/30 |
| | | | 257/758 |
| 2012/0018205 A1* | 1/2012 | Sato | H01G 4/008 |
| | | | 174/260 |
| 2012/0188684 A1 | 7/2012 | Akazawa et al. | |
| 2014/0301012 A1* | 10/2014 | Kim | H01G 4/1209 |
| | | | 361/301.4 |
| 2015/0041198 A1* | 2/2015 | Lee | H01G 4/30 |
| | | | 174/260 |
| 2015/0302991 A1* | 10/2015 | Choi | H01G 4/30 |
| | | | 174/260 |
| 2017/0164466 A1* | 6/2017 | Park | H01G 4/35 |
| 2017/0169952 A1* | 6/2017 | Kato | H01G 4/005 |
| 2017/0186544 A1* | 6/2017 | Seo | H01G 4/012 |
| 2017/0278634 A1* | 9/2017 | Kato | H01G 4/012 |
| 2018/0027656 A1* | 1/2018 | Jung | H05K 1/181 |
| | | | 174/260 |
| 2018/0035545 A1* | 2/2018 | Lee | H01G 2/06 |
| 2018/0130603 A1* | 5/2018 | Chong | H01B 3/12 |
| 2018/0190433 A1* | 7/2018 | Cho | H01G 4/30 |
| 2019/0074137 A1* | 3/2019 | Lee | H01G 4/30 |
| 2019/0115153 A1* | 4/2019 | Park | H01G 4/224 |
| 2019/0148068 A1* | 5/2019 | Lee | H01G 4/232 |
| | | | 361/301.4 |
| 2019/0180936 A1* | 6/2019 | Cha | H01G 4/005 |
| 2020/0051739 A1* | 2/2020 | Park | H01G 4/1227 |
| 2020/0051740 A1* | 2/2020 | Park | H01G 4/012 |

* cited by examiner

I - I'

II - II'

CAPACITOR COMPONENT

CROSS-REFERENCE TO RELATED APPLICATION(S)

This application claims benefit of priority to Korean Patent Application No. 10-2018-0163800 filed on Dec. 18, 2018 in the Korean Intellectual Property Office, the disclosure of which is incorporated herein by reference in its entirety.

TECHNICAL FIELD

The present disclosure relates to a capacitor component.

BACKGROUND

A multilayer ceramic capacitor (MLCC), among capacitor components, has advantages such as a small size, high capacitance, an ease of mounting feature, and the like.

As electronic components have recently been implemented with higher functions, the use current is increasing, and in order to increase the use time of a battery, a reduction in the use voltage and slimness of the battery are required.

To this end, impedance of a set power supply terminal that connects a DC-DC converter and an integrated circuit chip (IC) to each other should be reduced.

In general, in order to reduce impedance, there is a method of using a plurality of MLCCs connected in parallel, but there is a problem that a mounting area may be increased.

Thus, a three-terminal type MLCC in which three external electrodes are formed to lower equivalent series inductance (ESL) is used.

However, as a size of the MLCC becomes smaller according to the demand for miniaturization, it is difficult to secure high capacitance with a conventional MLCC structure, and it is also difficult to implement a three-terminal type external electrode.

SUMMARY

An aspect of the present disclosure may provide a capacitor component having improved capacitance per unit volume.

According to an aspect of the present disclosure, a capacitor component may include a body including a dielectric layer and first and second internal electrodes disposed to face each other in a first direction while having the dielectric layer interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; first and second margin portions disposed on the fifth and sixth surfaces, respectively; first and second connection parts disposed on the third and fourth surfaces, respectively, and including metal layers connected to the first internal electrode and ceramic layers disposed on the metal layers; a connection electrode penetrating through the body in the first direction and connected to the second internal electrode; a first external electrode disposed on one surface of the first connection part in the first direction; a second external electrode disposed on one surface of the second connection part in the first direction; and a third external electrode disposed on the body and connected to the connection electrode.

According to an aspect of the present disclosure, a capacitor component may include a body including a dielectric layer and first and second internal electrodes disposed to face each other in a first direction while having the dielectric layer interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; first and second margin portions disposed on the fifth and sixth surfaces, respectively; first and second connection parts disposed on the third and fourth surfaces, respectively, and including metal layers connected to the first internal electrode and ceramic layers disposed on the metal layers; a connection electrode penetrating through the body in the first direction and connected to the second internal electrode; a first external electrode disposed on one surface of the first connection part in the first direction; a second external electrode disposed on one surface of the second connection part in the first direction; and a third external electrode disposed on the body and connected to the connection electrode. The first margin portion covers one surface of each of the first and second connection parts in the third direction, and the second margin portion covers the other surface of each of the first and second connection parts in the third direction.

According to an aspect of the present disclosure, a capacitor component may include a body including a dielectric layer and first and second internal electrodes disposed to face each other in a first direction while having the dielectric layer interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction, the first internal electrode exposed from the third to sixth surfaces; first and second margin portions disposed on the fifth and sixth surfaces and being in contact with the first internal electrode, respectively; a first connection part disposed on the third surface, and including a first metal layer connected to the first internal electrode and a first ceramic layer disposed on the first metal layer; a second connection part disposed on the fourth surface, and including a second metal layer connected to the first internal electrode and a second ceramic layer disposed on the second metal layer; a connection electrode penetrating through the body in the first direction and connected to the second internal electrode; a first external electrode connected to the first metal layer; a second external electrode connected to the second metal layer; and a third external electrode disposed between the first and second external electrodes and connected to the connection electrode. Each of the first and second margin portions may be in contact with the first and second metal layers.

BRIEF DESCRIPTION OF DRAWINGS

The above and other aspects, features and other advantages of the present disclosure will be more clearly understood from the following detailed description taken in conjunction with the accompanying drawings, in which:

FIG. 6A illustrates a cross section from which a first internal electrode is observed and FIG. 6B illustrates a cross section from which a second internal electrode is observed;

FIG. 7A illustrates a ceramic green sheet in which the first internal electrode is printed on a dielectric layer and FIG. 7B illustrates a ceramic green sheet in which the second internal electrode is printed on the dielectric layer;

FIG. 9A illustrates a cross section from which a first internal electrode is observed and FIG. 9B illustrates a cross section from which a second internal electrode is observed;

FIG. 10A illustrates a ceramic green sheet in which the first internal electrode is printed on a dielectric layer and FIG. 10B illustrates a ceramic green sheet in which the second internal electrode is printed on the dielectric layer;

FIG. 15A illustrates a cross section from which a first internal electrode is observed and FIG. 15B illustrates a cross section from which a second internal electrode is observed.

DETAILED DESCRIPTION

Figure 1:
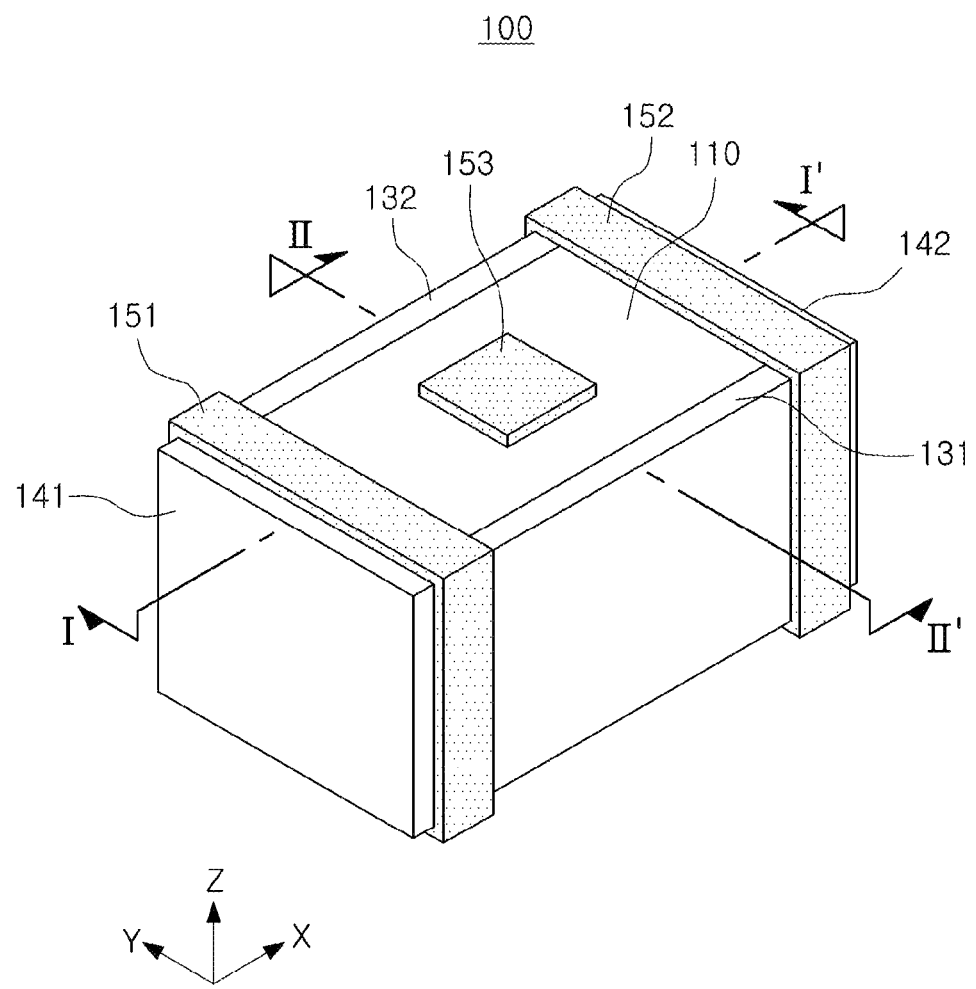
FIG. 1 is a schematic perspective view schematically illustrating a capacitor component according to an exemplary embodiment in the present disclosure.

Hereinafter, exemplary embodiments of the present disclosure will now be described in detail with reference to the accompanying drawings.

In the drawings, an X direction refers to a second direction, an L direction, or a length direction, a Y direction refers to a third direction, a W direction, or a width direction, and a Z direction refers to a first direction, a T direction, or a thickness direction.

Capacitor Component

FIG. 1 is a schematic perspective view schematically illustrating a capacitor component according to an exemplary embodiment in the present disclosure.

Figure 2:
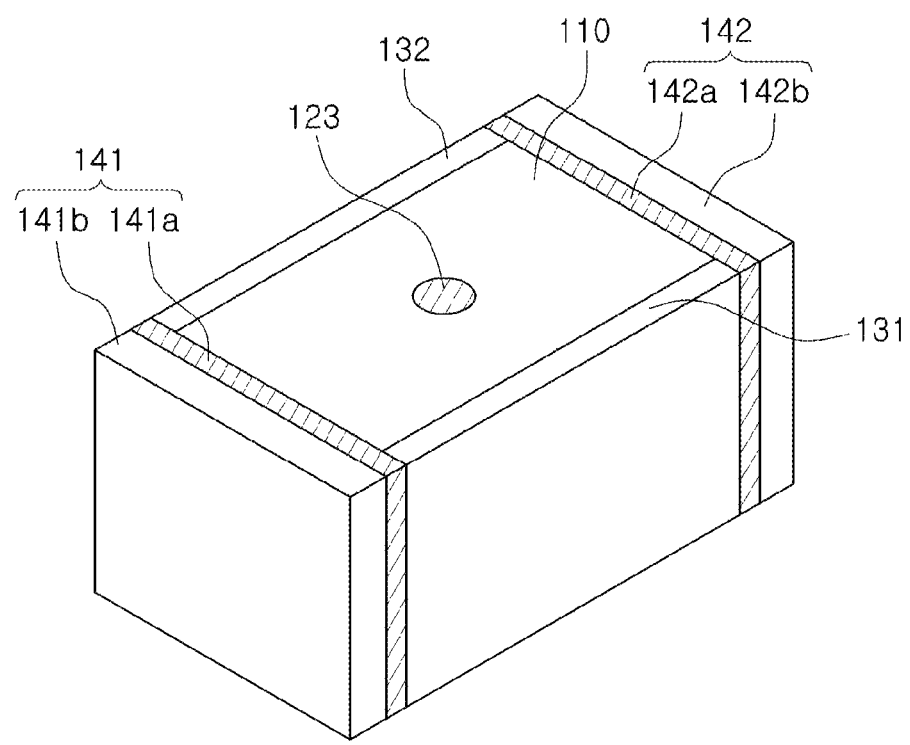
FIG. 2 is a perspective view illustrating the capacitor component of FIG. 1 from which first to third external electrodes are excluded.
Figure 2:
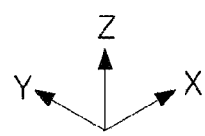

FIG. 2 is a perspective view illustrating the capacitor component of FIG. 1 from which first to third external electrodes are excluded.

Figure 3:
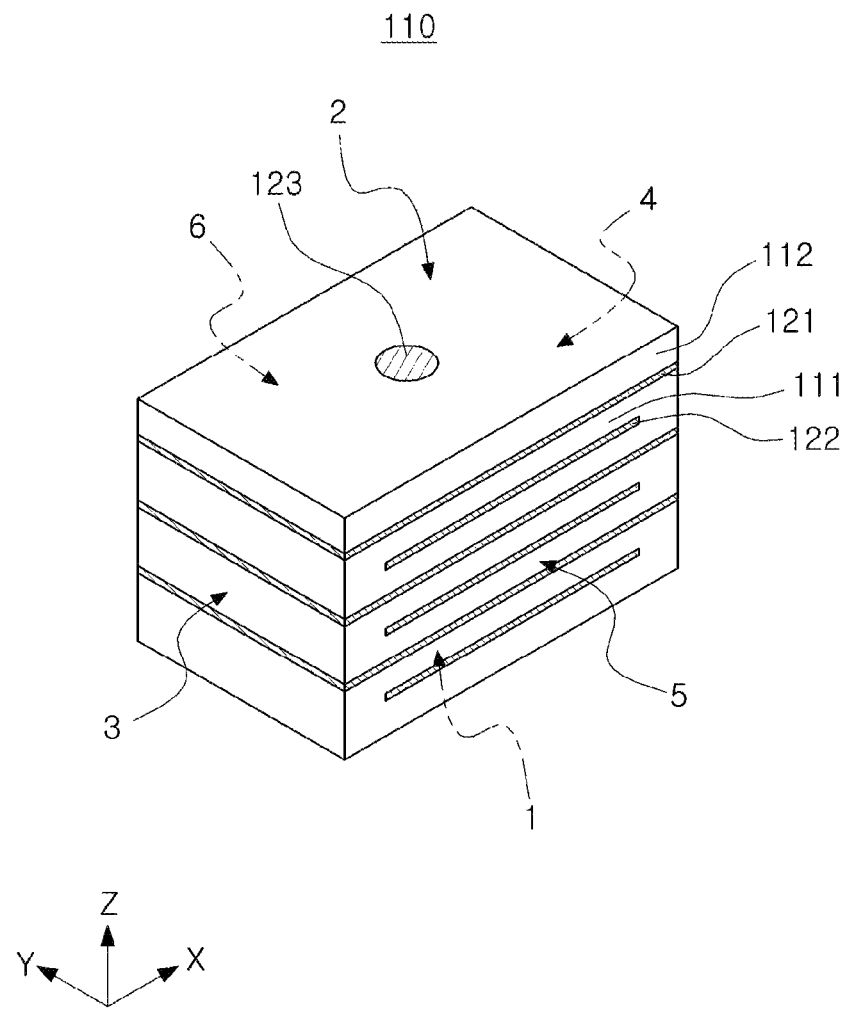
FIG. 3 is a perspective view illustrating a body according to an exemplary embodiment in the present disclosure.

FIG. 3 is a perspective view illustrating a body according to an exemplary embodiment in the present disclosure.

Figure 4:
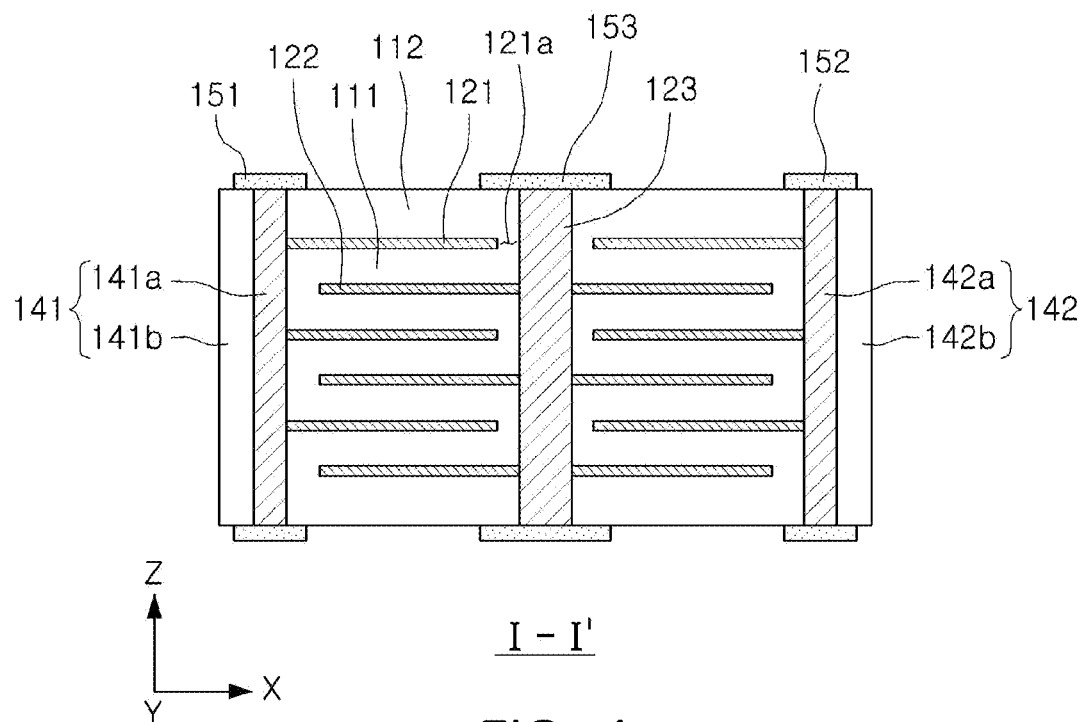
FIG. 4 is a cross-sectional view taken along line I-I' of FIG. 1.

FIG. 4 is a cross-sectional view taken along line I-I' of FIG. 1.

Figure 5:
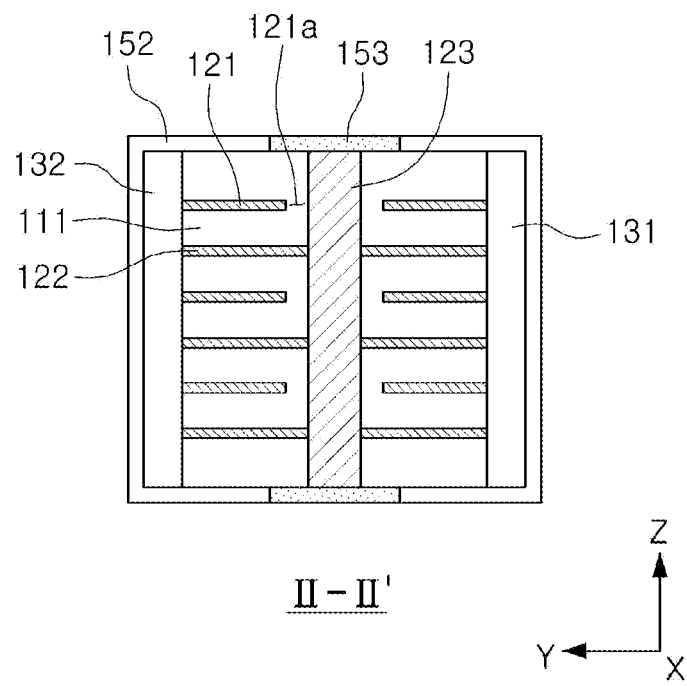
FIG. 5 is a cross-sectional view taken along line II-II' of FIG. 1.

FIG. 5 is a cross-sectional view taken along line II-II' of FIG. 1.

Figure 6A:
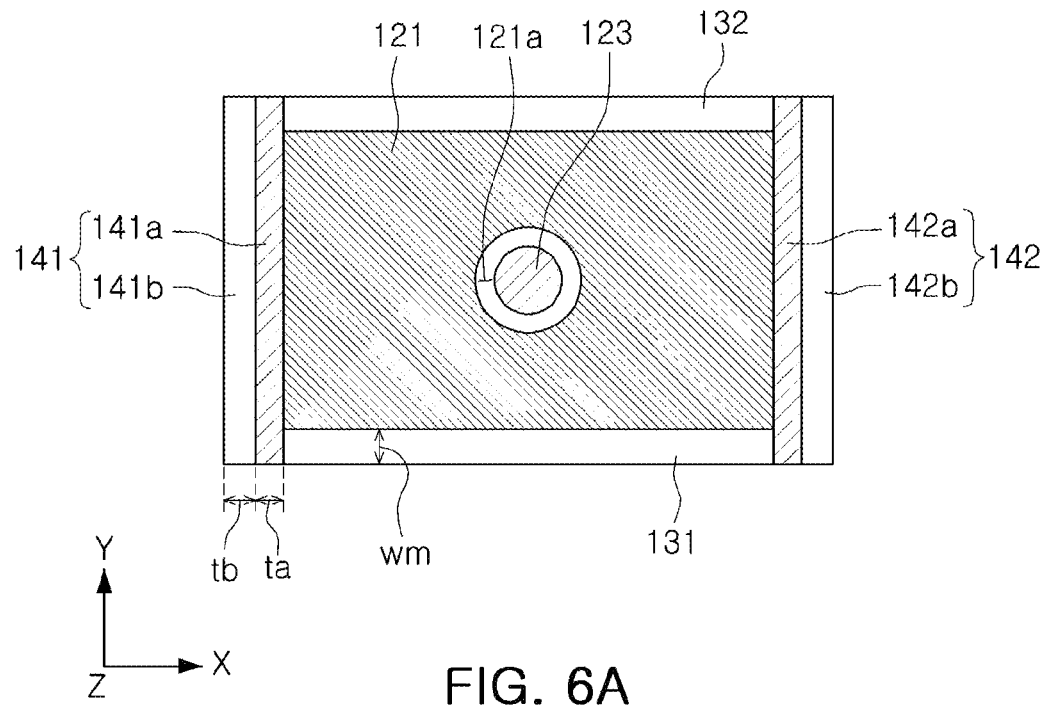
FIGS. 6A and 6B are cross-sectional views taken in X and Y directions of FIG. 1 including the body of the FIG. 3, where
Figure 6B:
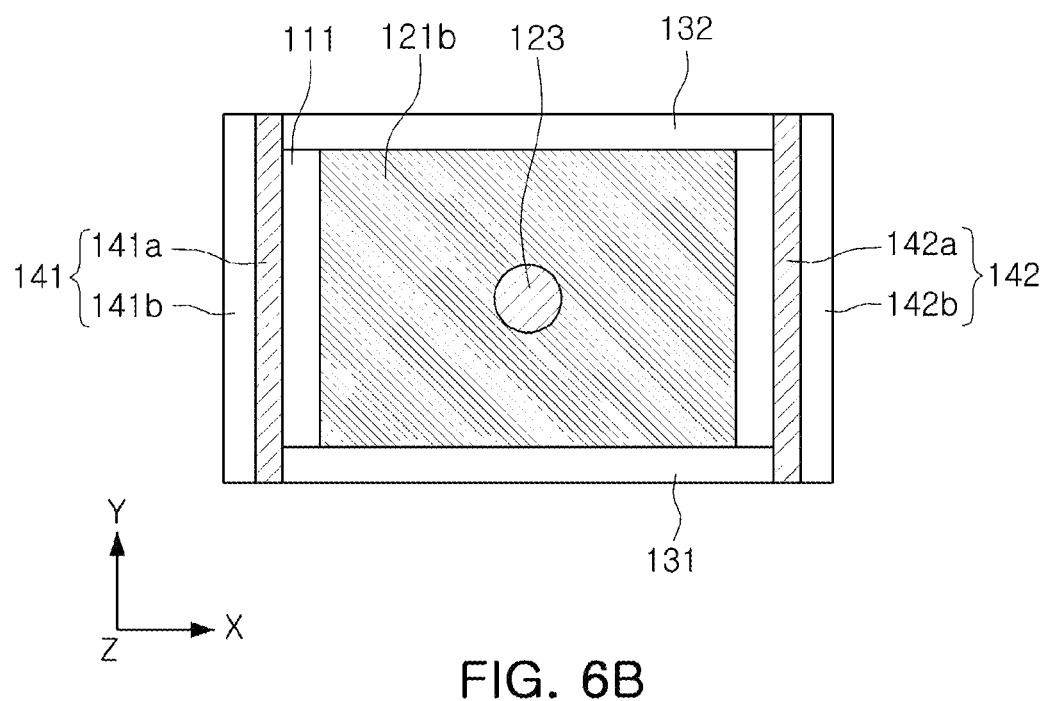

FIGS. 6A and 6B are cross-sectional views taken in X and Y directions of FIG. 1 including the body of the FIG. 3, where FIG. 6A illustrates a cross section from which a first internal electrode is observed and FIG. 6B illustrates a cross section from which a second internal electrode is observed.

Figure 7A:
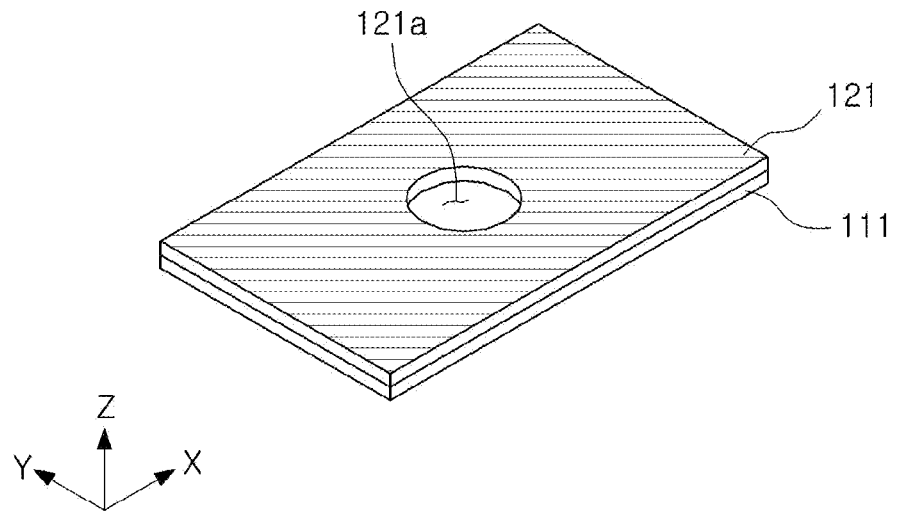
FIGS. 7A and 7B illustrate ceramic green sheets for manufacturing the body of FIG. 3, where
Figure 7B:
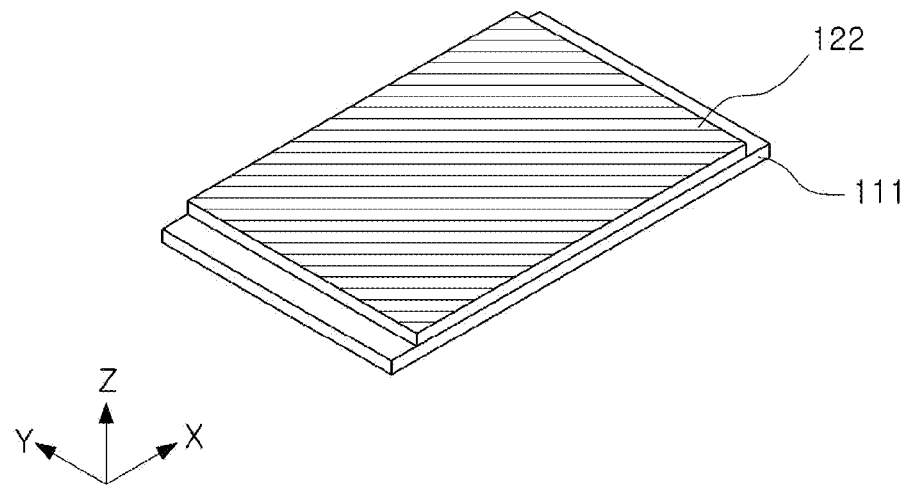

FIGS. 7A and 7B illustrate ceramic green sheets for manufacturing the body of FIG. 3, where FIG. 7A illustrates a ceramic green sheet in which the first internal electrode is printed on a dielectric layer and FIG. 7B illustrates a ceramic green sheet in which the second internal electrode is printed on the dielectric layer.

Hereinafter, a capacitor component according to an exemplary embodiment in the present disclosure will be described in detail with reference to FIGS. 1 through 7B.

A capacitor component 100 according to an exemplary embodiment in the present disclosure may include a body 110 including dielectric layers 111 and first and second internal electrodes 121 and 122 disposed to face each other in a first direction (Z direction) while having the dielectric layer 111 interposed therebetween, and including first and second surfaces 1 and 2 opposing each other in the first direction (Z direction), third and fourth surfaces 3 and 4 connected to the first and second surfaces and opposing each other in a second direction (X direction), and fifth and sixth surfaces 5 and 6 connected to the first to fourth surfaces and opposing each other in a third direction (Y direction); first and second margin portions 131 and 132 disposed on the fifth and sixth surfaces 5 and 6, respectively; first and second connection parts 141 and 142 disposed on the third and fourth surfaces 3 and 4, respectively, and including metal layers 141a and 142a connected to the first internal electrode 121 and ceramic layers 141b and 142b disposed on the metal layers 141a and 142a; a connection electrode 123 penetrating through the body 110 in the first direction (Z direction) and connected to the second internal electrode 122; a first external electrode 151 disposed on one surface of the first connection part 141 in the first direction (Z direction); a second external electrode 152 disposed on one surface of the second connection part 142 in the first direction (Z direction); and a third external electrode 153 disposed on the body 110 and connected to the connection electrode 123.

In the body 110, the dielectric layers 111 and the internal electrodes 121 and 122 may be alternately stacked.

A specific shape of the body 110 is not particularly limited, but the body 110 may be formed to have a hexahedral shape as illustrated or a shape similar thereto. Due to the shrinkage of ceramic powders contained in the body 110 during a sintering process, the body 110 may have a substantially hexahedral shape, although it may not be a hexahedral shape with completely straight lines.

The body 110 may have the first and second surfaces 1 and 2 opposing each other in a thickness direction (Z direction) thereof, the third and fourth surfaces 3 and 4 connected to the first and second surfaces 1 and 2 and opposing each other in a length direction (X direction) thereof, and the fifth and sixth surfaces 5 and 6 connected to the first and second surfaces 1 and 2, connected to the third and fourth surfaces 3 and 4, and opposing each other in a width direction (Y direction) thereof.

Here, one surface selected from the first, second, fifth, and sixth surfaces 1, 2, 5 and 6 may be a mounting surface.

A plurality of dielectric layers 111 forming the body 110 may be in a sintered state, and the dielectric layers 111 adjacent to each other may be integrated with each other so that a boundary therebetween is not readily apparent without using a scanning electron microscope (SEM).

According to an exemplary embodiment in the present disclosure, a raw material of the dielectric layer 111 is not particularly limited as long as it may obtain a sufficient capacitance. For example, a barium titanate-based material, a lead composite perovskite-based material, a strontium titanate-based material, or the like may be used.

The material of the dielectric layer 111 may be prepared by adding various ceramic additives, organic solvents, plasticizers, binders, dispersing agents, and the like, to a powder such as barium titanate ($BaTiO_3$) powder, or the like, according to an object of the present disclosure.

Lower and upper cover parts 112 having a predetermined thickness may be formed below the lowest internal electrode of the body 110 and on the uppermost internal electrode of the body 110. Here, the lower and upper cover parts 112 may be formed of the same composition as that of the dielectric layer 111 and be formed by stacking one or more dielectric layers that do not include the internal electrodes on the uppermost internal electrode of the body 110 and below the lowest internal electrode of the body 110, respectively.

The plurality of internal electrodes 121 and 122 may be disposed to face each other while having the dielectric layer 111 interposed therebetween.

The internal electrodes 121 and 122 may include first and second internal electrodes 121 and 122 alternately disposed to face each other while having the dielectric layer 111 interposed therebetween.

The first internal electrode 121 may be exposed to the third to sixth surfaces 3, 4, 5, and 6 of the body 110. A portion exposed to the third surface 3 may be connected to the first connection part 141 and a portion exposed to the fourth surface 4 may be connected to the second connection part 142.

The second internal electrode 122 may be spaced apart from the third and fourth surfaces 3 and 4 of the body 110 and may be exposed to the fifth and sixth surfaces 5 and 6 of the body 110.

The connection electrode 123 may penetrate through the body 110 in the first direction (Z direction) and may be connected to the second internal electrode 122.

The first internal electrode 121 may include an insulating part 121a and the connection electrode 123 may penetrate through the insulating part 121a so as to be spaced apart from the first internal electrode 121.

The insulating part 121a may be an empty space or may be filled with an insulating material to serve to electrically separate the first internal electrode 121 from the connection electrode 123. Therefore, the first and second internal electrodes 121 and 122 may be electrically separated from each other by the dielectric layer 111 disposed therebetween and the insulating part 121a included in the first internal electrode 121.

A material forming each of the first and second internal electrodes 121 and 122 is not particularly limited, but may be a conductive paste including one or more of, for example, a noble metal material such as palladium (Pd), a palladium-silver (Pd—Ag) alloy, or the like, nickel (Ni), and copper (Cu).

A method of printing the conductive paste may be a screen-printing method, a gravure printing method, or the like, but is not limited thereto.

A material forming the connection electrode 123 is not particularly limited, but the connection electrode 123 may be formed by filling a conductive paste formed of one or more of, for example, a noble metal material such as palladium (Pd), a palladium-silver (Pd—Ag) alloy, or the like, nickel (Ni), and copper (Cu) in a via, or a plating method.

The body 110 may be formed by alternatively stacking a ceramic green sheet (FIG. 7A) in which the first internal electrode 121 is printed on the dielectric layer 111 and a ceramic green sheet (FIG. 7B) in which the second internal electrode 122 is printed on the dielectric layer 111 in a thickness direction (Z direction). Thereafter, a via penetrating through the body 110 in the first direction (Z direction) may be formed using a laser drill, a mechanical pin puncher, or the like and a conductive material may be filled in the via, thereby forming the connection electrode 123.

On the other hand, although a shape of the connection electrode 123 is illustrated as a circle, the connection electrode 123 may have a shape such as a square or a triangle, and the shape of the connection electrode 123 is not particularly limited. In addition, a plurality of connection electrodes 123 may be formed.

In addition, the connection electrode 123 may occupy to 65% of the body based on the width direction (Y direction) of the body, but is not limited thereto.

The first and second margin portions 131 and 132 may be disposed on the fifth and sixth surfaces 5 and 6, respectively, and the first and second connection parts 141 and 142 may be disposed on the third and fourth surfaces 3 and 4, respectively.

The first and second margin portions 131 and 132 may be formed of an insulating material, and may be formed of a ceramic material such as barium titanate. In this case, the first and second margin portions 131 and 132 may include the same ceramic material as that included in the dielectric layer 111 or may be formed of the same material as the dielectric layer 111.

A method of forming the first and second margin portions 131 and 132 is not particularly limited, but may be formed, for example, by applying a slurry including ceramic, or stacking dielectric sheets on the fifth and sixth surfaces 5 and 6 of the body in a third direction (Y direction).

In addition, the first and second margin portions 131 and 132 may also be formed by transferring the dielectric sheets using a transfer method described later. Accordingly, the first and second margin portions 131 and 132 may have a uniform thickness, and a ratio of the minimum value to the maximum value of the thickness of the first and second margin portions 131 and 132 may be 0.9 to 1.0.

In a case in which the first and second margin portions 131 and 132 are formed using the method of transferring the dielectric sheets, it is preferable that the first and second margin portions 131 and 132 before being sintered has high adhesion for purpose of a transfer process. To this end, the first and second margin portions 131 and 132 may include a relatively large amount of an organic material such as a binder. In this case, since some of the organic material may remain even after the first and second margin portions 131 and 132 are sintered, the margin portions 131 and 132 may include a larger amount of the organic material component than that of the dielectric layer 111. For example, a weight ratio of the organic material component included in the margin portions 131 and 132 with respect to the total weight of the margin portions 131 and 132 may be greater than a weight ratio of the organic material component included in the dielectric layer 111 with respect to the total weight of the dielectric layer 111. That is, the margin portions 131 and 132 may be composed of a material composition different from that of the dielectric layer 111.

In an exemplary embodiment in the present disclosure, the first margin portion 131 may be disposed within a range that does not deviate from the fifth surface 5 and the second margin portion 132 may be disposed within a range that does not deviate from the sixth surface 6. In addition, the first margin portion 131 may have a shape and size corresponding to the fifth surface 5 and the second margin portion 132 may have a shape and size corresponding to the sixth surface 6.

A width (wm) of each of the first and second margin portions 131 and 132 is not particularly limited, but may be, for example, 5 to 30 μm. Here, the width (wm) of each of the first and second margin portions refers to a length of each of the first and second margin portions 131 and 132 in the third direction (Y direction).

When the internal electrodes are exposed to the outside of the body, a short circuit occurs due to an introduction of conductive foreign substances or the like, thereby decreasing reliability of a multilayer ceramic capacitor. Therefore, conventionally, when the internal electrodes are formed in the dielectric layer, an area of the dielectric layer is formed to be greater than the area of the internal electrodes, and a margin region is formed in the remaining peripheral portion of the internal electrodes excluding the portions connected to the external electrodes. When the internal electrodes are formed in the dielectric layer in the manufacturing process, the internal electrodes have a shape that protrudes from the margin region. Such a protruding shape may cause a step, and when several tens to several hundreds of dielectric layers are stacked, the dielectric layers are stretched to fill the step. When the dielectric layers are stretched, the internal electrodes may also be bent. When the internal electrodes are bent, a breakdown voltage (BDV) may be reduced at the corresponding bent portions.

Therefore, the capacitor component according to an exemplary embodiment in the present disclosure may prevent the occurrence of the step due to the internal electrodes by removing the margin region from the fifth and sixth surfaces 5 and 6 of the body 110. Accordingly, reliability of the multilayer ceramic capacitor may be improved by preventing the internal electrodes from being bent in the third direction (Y direction) and preventing the breakdown voltage from being reduced.

Since the first internal electrode 121 and the second internal electrode 122 are both exposed on the fifth and sixth surfaces 5 and 6, it is necessary to separately dispose the first and second margin portions 131 and 132 to protect the internal electrodes exposed from the margin portions 131 and 132. The first internal electrode 121 is formed to be led to the third and fourth surfaces 3 and 4, but since the first connection part 141 is formed on the third surface 3 and the second connection part 142 is formed on the fourth surface 4, the first internal electrode 121 is not exposed to the outside and may be protected by the first and second connection portions 141 and 142.

Further, conventionally, there has been a need to sufficiently secure the width of the margin region in consideration of manufacturing errors such as misalignment of the internal electrodes. However, in the body 110 according to the present disclosure, since the first and second internal electrodes 121 and 122 are both exposed to the fifth and sixth surfaces 5 and 6 through a cutting process or the like, it is not necessary to consider the manufacturing errors such as misalignment of the internal electrodes. Therefore, since the width (wm) of each of the first and second margin portions 131 and 132 may be set to be smaller than the width of the conventional margin region, capacitance per unit volume of the capacitor component may be improved.

In addition, in the conventional three-terminal type capacitor component, there is a need to dispose a separate lead part on the margin region in the width direction to connect the third external electrode and the second internal electrode disposed on the fifth and sixth surfaces. However, according to the present disclosure, since the third external electrode 153 and the second internal electrode 122 are connected to each other through the connection electrode 123, an area in which the first internal electrode 131 and the second internal electrode 132 overlap with each other may be increased as compared to the conventional overlapping area, and a width of the capacitor component may be significantly reduced by introducing the first and second margin portions 131 and 132. As a result, the capacitance per unit volume of the capacitor component may be significantly improved.

The first and second connection parts 141 and 142 may be disposed on the third and fourth surfaces 3 and 4, respectively, and may include metal layers 141a and 142a connected to the first internal electrode 121 and ceramic layers 141b and 142b disposed on the metal layers 141a and 142a.

Conventionally, since the first and second external electrodes are formed on the third and fourth surfaces 3 and 4 to which the first internal electrode 121 is exposed using a method of dipping the capacitor component in a conductive paste, the first and second external electrodes were thick and thus the capacitance per unit volume of the capacitor component was degraded. However, according to the present disclosure, the first and second connection parts 141 and 142 are introduced such that a length of the capacitor component may be significantly reduced and the capacitance per unit volume of the capacitor component may be improved.

The metal layers 141a and 142a may be disposed on the third and fourth surfaces 3 and 4 of the body and be connected to the first internal electrode 121.

The metal layers 141a and 142a may include a metal material having high electrical conductivity and may include the same metal as the first internal electrode 121 in order to enhance electrical connection with the first internal electrode 121. For example, the metal layers 141a and 142a may include, for example, one or more of a noble metal material such as palladium (Pd), a palladium-silver (Pd—Ag) alloy, or the like, nickel (Ni), and copper (Cu).

In the present exemplary embodiment, the metal layers 141a and 142a may be provided in a form of a sintered electrode, and may be sintered simultaneously with the body 110. In this case, the metal layers 141a and 142a before being sintered may be transferred to the body 110 in a state in which it includes metal particles, and an organic material such as a binder, and the organic material, or the like may be removed after the metal layer 141a and 142a are sintered.

A thickness ta of the metal layer is not particularly limited, but may be, for example, 1 to 5 μm. Here, the thickness ta of the metal layer may refer to a length of the metal layer in the second direction (X direction).

The ceramic layers 141b and 142b may be disposed on the metal layers 141a and 142a, and may serve to improve sealing characteristics and significantly reduce permeation of water, a plating solution, and the like from the outside. The ceramic layers 141b and 142b may be formed so as not to cover end surfaces of the metal layers 141a and 142a in the first direction (Z direction) and the third direction (Y direction).

The ceramic layers 141b and 142b may be formed of a ceramic material such as barium titanate or the like. In this case, the ceramic layers 141b and 142b may include the same ceramic material as that included in the dielectric layer 111 or may be formed of the same material as the dielectric layer 111.

The ceramic layers 141b and 142b may be formed by the transferring method similarly to the metal layers 141a and 142a, and may be then subjected to a sintering process. The ceramic layers 141b and 142b before being sintered need to have high adhesion for the purpose of a transfer process. To this end, the ceramic layers 141b and 142b before being sintered may include a relatively large amount of organic material such as a binder, or the like. In this case, since some of the organic material may remain even after the ceramic layers 141b and 142b are sintered, the ceramic layers 141b and 142b may include a larger amount of organic material component than that of the dielectric layer 111. For example, a weight ratio of the organic material component included in the ceramic layers 141b and 142b with respect to the total weight of the ceramic layers 141b and 142b may be greater than a weight ratio of the organic material component included in the dielectric layer 111 with respect to the total weight of the dielectric layer 111. That is, the first and second ceramic layers 141b and 142b may be composed of a material composition different from that of the dielectric layer 111.

A thickness tb of the ceramic layer is not particularly limited, but may be, for example, 1 to 25 μm. Here, the thickness tb of the ceramic layer may refer to a length of the ceramic layer in the second direction (X direction).

The first and second connection parts 141 and 142 may be formed using a method of transferring sheets and may have a uniform thickness. Accordingly, a ratio of the minimum value to the maximum value of the thickness of each of the first and second connection parts 141 and 142 may be 0.9 to 1.0. Here, the thickness of each of the first and second connection parts 141 and 142 may refer to a length of each of the first and second connection parts 141 and 142 in the second direction (X direction).

Figure 16:
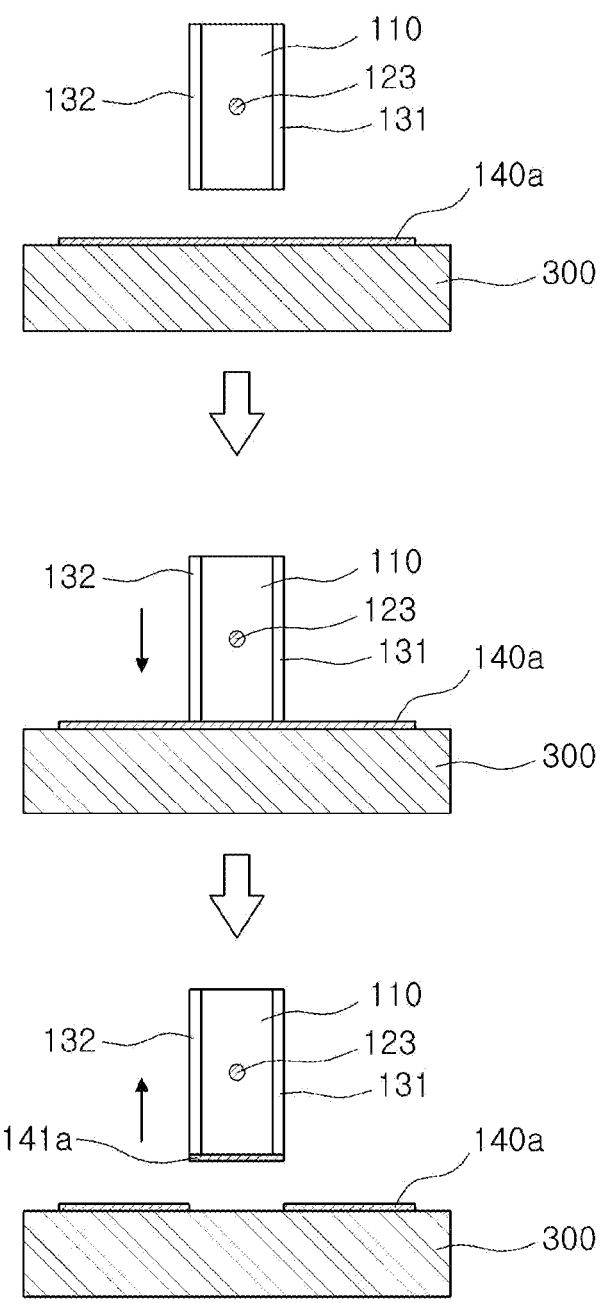
FIGS. 16 through 18 are views illustrating processes of forming a connection part of a capacitor component according to an exemplary embodiment in the present disclosure by a transfer method.
Figure 17:
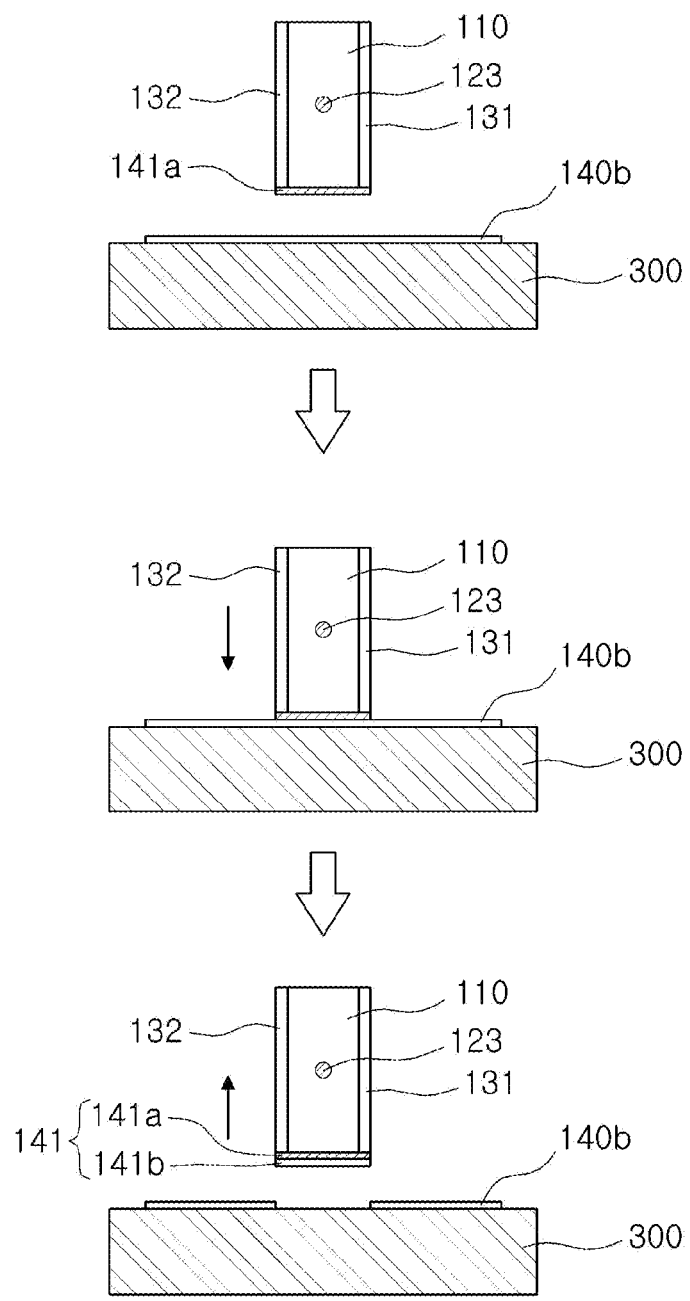
Figure 18:
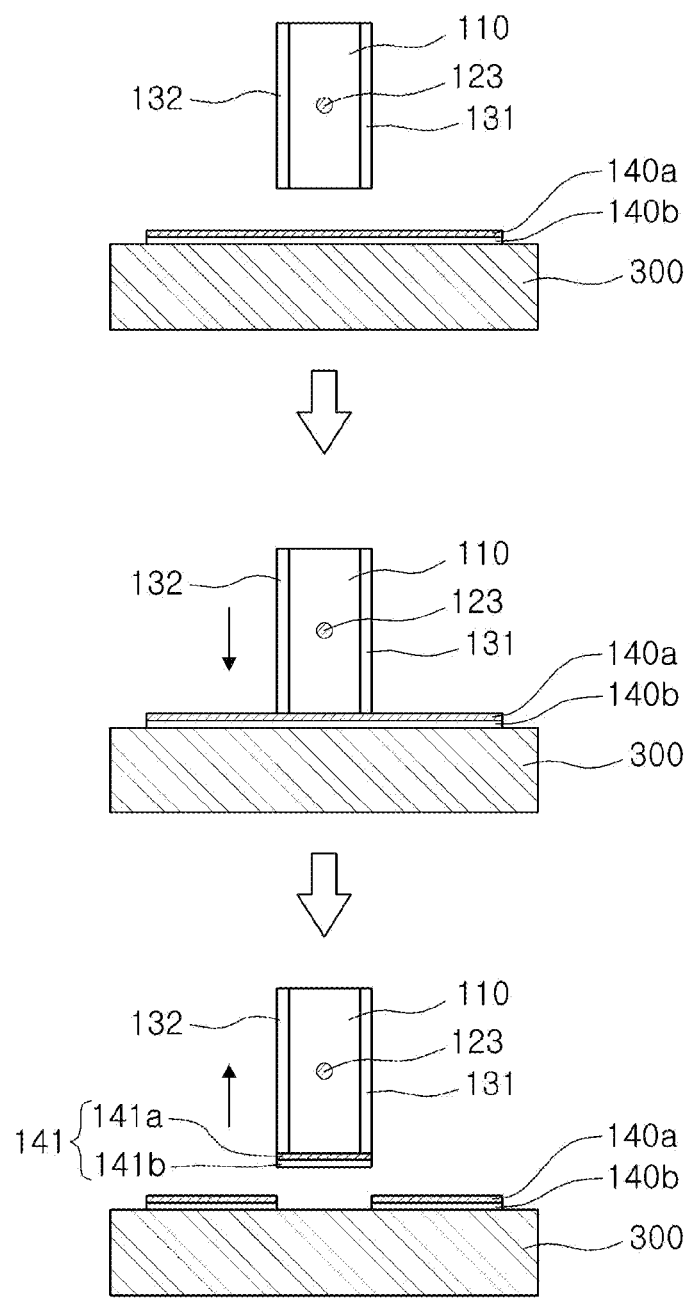

FIGS. 16 through 18 are views illustrating processes of forming a connection part 141 of a capacitor component according to an exemplary embodiment in the present disclosure by a transfer method.

As illustrated in FIG. 16, in a process of transferring the metal layers 141a, after a metal layer sheet 140a is prepared on a support 300, the body 110 may be compressed to the metal layer sheet 140a to allow the metal layer 141a to be attached to a surface of the body 110. The metal layer sheet 140a may be in a state before being sintered, and may include components such as a binder, an organic solvent, and the like.

Thereafter, as illustrated in FIG. 17, after a ceramic layer sheet 130b is prepared on the support 300, the body 110 may be compressed to the ceramic layer sheet 130b to allow the ceramic layer 141b to be attached to a surface of the metal layer 141a. The ceramic layer sheet 140b may be in a state before being sintered, and may include components such as a binder, an organic solvent, and the like.

Therefore, the metal layer 142a and the ceramic layer 142b may be formed by repeating the same process on a surface opposing the surface on which the metal layer 141a and the ceramic layer 141b are formed.

Alternatively, the first connection part 141 may also be formed by a single transfer process by preparing the ceramic layer sheet 140b and the metal layer sheet 140a on the support 300 in a stacked state, as illustrated in FIG. 18, without separately transferring the metal layer and the ceramic layer.

As the first and second connection parts 141 and 142 are formed using the transferring method after the first and second margin portions 131 and 132 are formed on the body 110, the first connection part 141 may be disposed to cover one surface of each of the first and second margin portions 131 and 132 in the second direction (X direction), and the second connection part 142 may be disposed to cover the other surface of each of the first and second margin portions 131 and 132 in the second direction (X direction).

In addition, the first connection part 141 may be disposed within a range that does not deviate from the third surface 3 and one surface of each of the first and second margin portions 131 and 132 in the second direction (X direction), and the second connection part 142 may be disposed within a range that does not deviate from the fourth surface 4 and the other surface of each of the first and second margin portions 131 and 132 in the second direction (X direction). That is, the first connection part 141 may not extend to the first and second surfaces 1 and 2 of the body, and may not extend to opposite surfaces of the first and second margin portions 131 and 132 in the third direction (Y direction).

In addition, the first connection part 141 may have a shape and size corresponding to a summed surface of the third surface 3 and one surface of each of the first and second margin portions 131 and 132 in the second direction (X direction), and the second connection part 142 may have a shape and size corresponding to a summed surface of the fourth surface 4 and the other surface of each of the first and second margin portions 131 and 132 in the second direction (X direction).

Accordingly, one surface of each of the first and second connection parts 141 and 142 in the third direction (Y direction) may be disposed on the same plane as one surface of the first margin portion 131 exposed to the outside in the third direction (Y direction), and the other surface of each of the first and second connection parts 141 and 142 in the third direction (Y direction) may be disposed on the same plane as one surface of the second margin portion 132 exposed to the outside in the third direction (Y direction).

In addition, one surface of each of the first and second margin portions and the first and second connection parts 131, 132, 141, and 142 in the first direction (Z direction) may be disposed on the same plane as the first surface 1, and the other surface of each of the first and second margin portions and the first and second connection parts 131, 132, 141, and 142 in the first direction (Z direction) may be disposed on the same plane as the second surface 2.

The first external electrode 151 may be disposed on one surface of the first connection part 141 in the first direction (Z direction), and the second external electrode 152 may be disposed on one surface of the second connection part 142 in the first direction (Z direction).

The first and second external electrodes 151 and 152 may be electrically connected to the first internal electrode 121 through the metal layers 141a and 142a of the first and second connection parts 141 and 142, respectively.

Here, the first external electrode 151 may be disposed on opposite surfaces of the first connection part 141 in the first direction (Z direction) and opposite surfaces of the first connection part 141 in the third direction (Y direction), and the second external electrode 152 may be disposed on opposite surfaces of the second connection part 142 in the first direction (Z direction) and opposite surfaces of the second connection part 142 in the third direction (Y direction). Accordingly, when the capacitor component is mounted on the board, a contact area with solders may be increased and adhesion with the board may be further improved.

The third external electrode 153 may be disposed on the body 110 and may be electrically connected to the second internal electrode 122 through the connection electrode 123.

The first and second external electrodes 151 and 152 may be signal electrodes, and the third external electrode 153 may be a ground electrode. As such, as the external electrodes are formed in multi-terminal form, an equivalent series inductance (ESL) may be lowered.

A material forming each of the first to third external electrodes 151, 152, and 153 is not particularly limited, but may be a conductive paste including one or more materials of, for example, a noble metal material such as palladium (Pd), a palladium-silver (Pd—Ag) alloy, or the like, nickel (Ni), and copper (Cu).

A method of printing the conductive paste may be a screen printing method, a gravure printing method, or the like, but is not limited thereto.

Meanwhile, in order to improve mountability with the board, a plating layer may be formed on the first to third external electrodes 151, 152, and 153.

More specifically, the plating layer may be a nickel (Ni) plating layer or a tin (Sn) plating layer. The Ni plating layer and the Sn plating layer may be sequentially formed on the electrodes. The plating layer may also include a plurality of Ni plating layers and/or a plurality of Sn plating layers.

A size of the capacitor component 100 is not particularly limited, but as the size of the capacitor component is smaller, the capacitance per unit volume according to the present disclosure may be significantly improved.

In particular, in the case of the capacitor component of 0603 size having a length of 0.6 mm or less and a width 0.3 mm or less, the capacitance per unit volume may be significantly improved. Here, the length of the capacitor component may refer to a length of the capacitor component in the second direction (X direction), and the width of the capacitor component may refer to a length of the capacitor component in the third direction (Y direction).

In the case of the conventional capacitor component having a structure in which the first and second external electrodes are formed on the third and fourth surfaces of the body by the dipping process, and the third external electrode is connected to the second internal electrode through the lead part of the second internal electrode exposed to the fifth and sixth surfaces of the body, a capacitor of 1005 size has capacitance of about 4.3 µF and a capacitor of 0603 size has about 1 µF.

On the other hand, according to the present disclosure, when the length of the capacitor component is significantly reduced by disposing the first connection parts 141 and 142 on the third and fourth surfaces 3 and 4 of the body, the width of the capacitor component is significantly reduced by disposing the first and second margin portions 131 and 132 on the fifth and sixth surfaces 5 and 6 of the body, and the overlapping area of the first internal electrode 121 and the second internal electrode 122 is improved by connecting the second internal electrode 122 to the third external electrode 153 through the connection electrode 123, the capacitor component of the 0603 size having capacitance of about 4.7 µF may be implemented.

Therefore, the conventional capacitor of 1005 size may be replaced, and four capacitors of 0603 size connected in parallel and used may be replaced by one capacitor, thereby reducing a mounting space.

Figure 8:
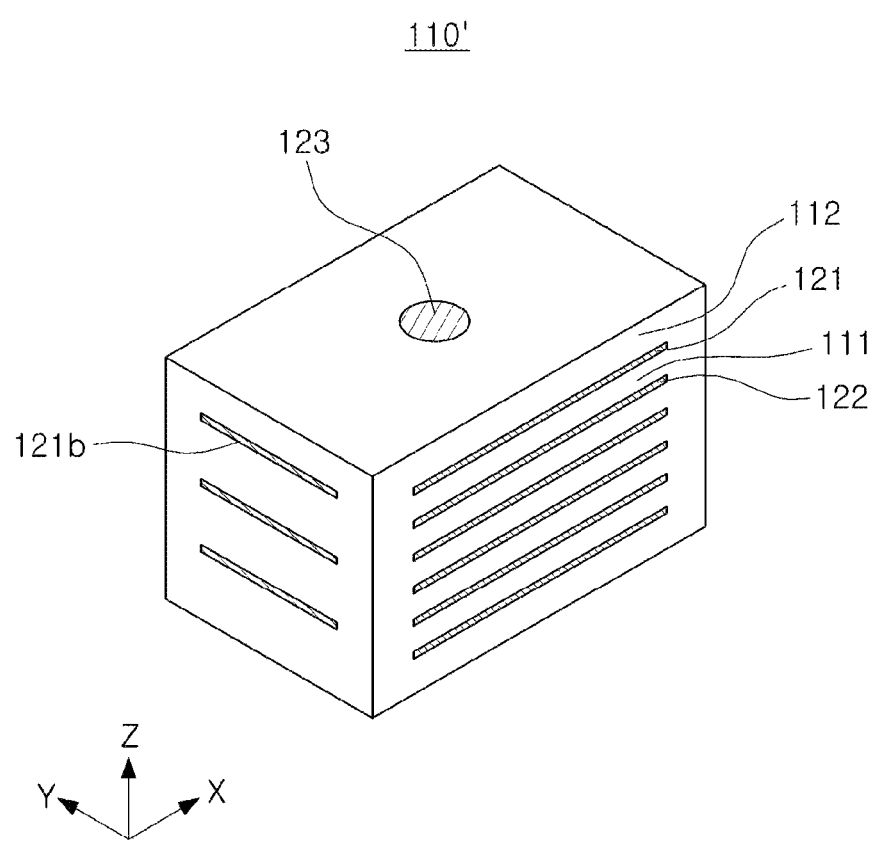
FIG. 8 is a perspective view illustrating a body according to another exemplary embodiment in the present disclosure.

FIG. 8 is a perspective view illustrating a body 110' according to another exemplary embodiment in the present disclosure.

Figure 9A:
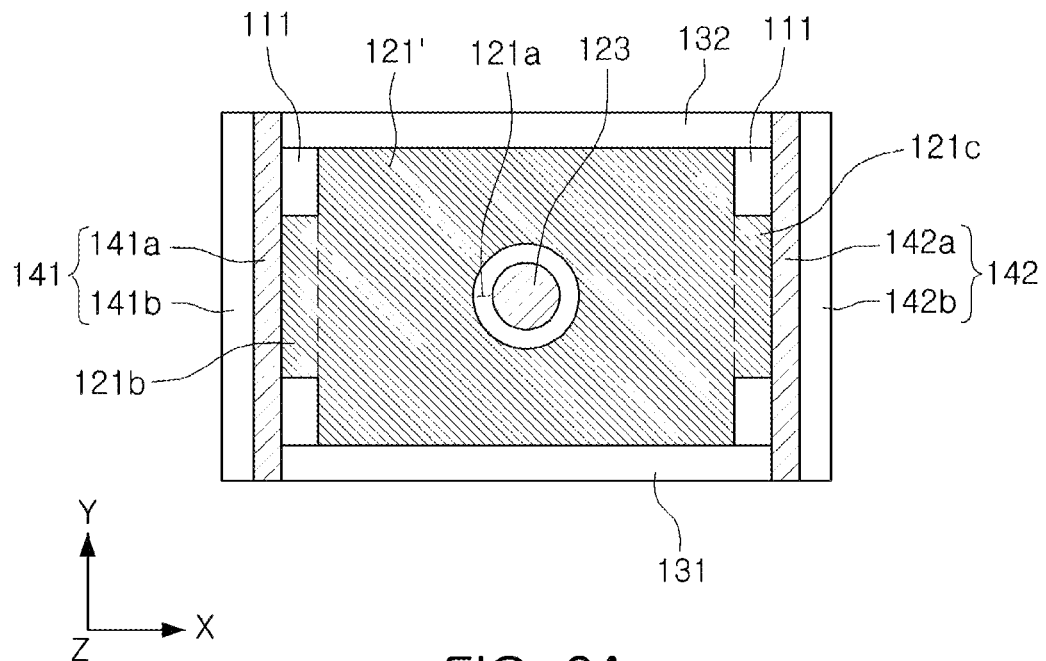
FIGS. 9A and 9B are cross-sectional views taken in X and Y directions of FIG. 1 including the body of the FIG. 8, where
Figure 9B:
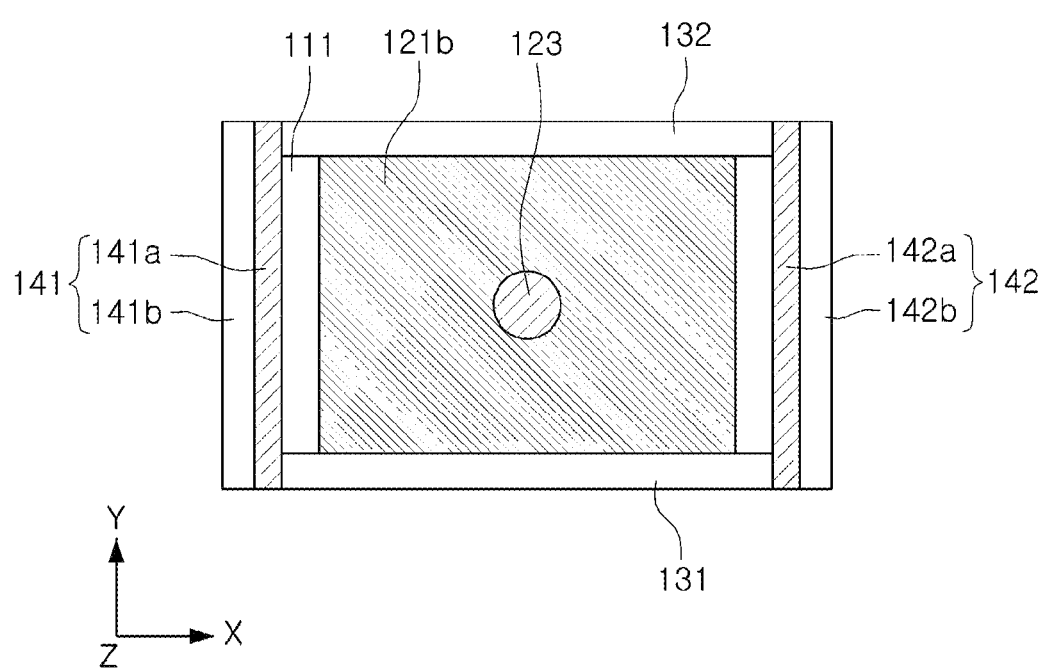

FIGS. 9A and 9B are cross-sectional views taken in the X and Y directions of FIG. 1 including the body 110' of the FIG. 8, where FIG. 9A illustrates a cross section from which a first internal electrode 121' is observed and FIG. 9B illustrates a cross section from which a second internal electrode is observed.

Figure 10A:
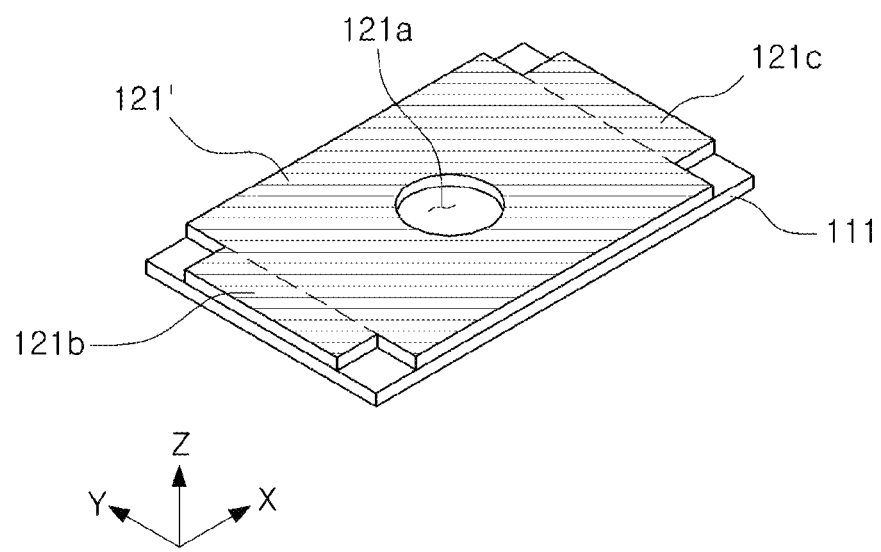
FIGS. 10A and 10B illustrate ceramic green sheets for manufacturing the body of FIG. 8, where
Figure 10B:
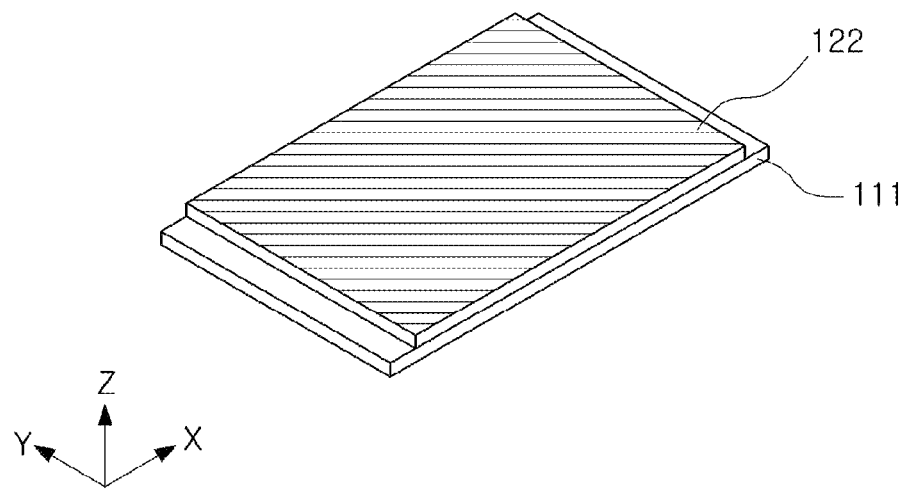

FIGS. 10A and 10B illustrate ceramic green sheets for manufacturing the body of FIG. 8, where FIG. 10A illustrates a ceramic green sheet in which the first internal electrode 121' is printed on a dielectric layer and FIG. 10B illustrates a ceramic green sheet in which the second internal electrode is printed on the dielectric layer.

Referring to FIGS. 8 through 10B, in a body 110' according to another exemplary embodiment in the present disclosure, a first internal electrode 121' may be exposed to third and fourth surfaces 3 and 4 of the body 110' through lead parts 121b and 121c, and a width of each of the lead parts 121b and 121c may be smaller than a width of the body 110'. That is, a length of each of the lead parts 121b and 121c in the third direction (Y direction) may be smaller than a length of the body 110' in the third direction (Y direction).

Since the second internal electrode 122 is formed to be spaced apart from the third and fourth surfaces 3 and 4 of the body, ends of the first internal electrode exposed to the third and fourth surfaces 3 and 4 may not overlap the second internal electrode 122 and may not thus contribute to form the capacitance. On the other hand, since corner portions of the body may be main paths of moisture permeation. Therefore, when the first internal electrode 121' is not exposed to the corner portions of the body by the lead parts 121b and 121c each having the width smaller than that of the body according to another exemplary embodiment in the present disclosure, wetproof reliability of the capacitor component may be improved while maintaining the capacitance of the capacitor component.

Figure 11:
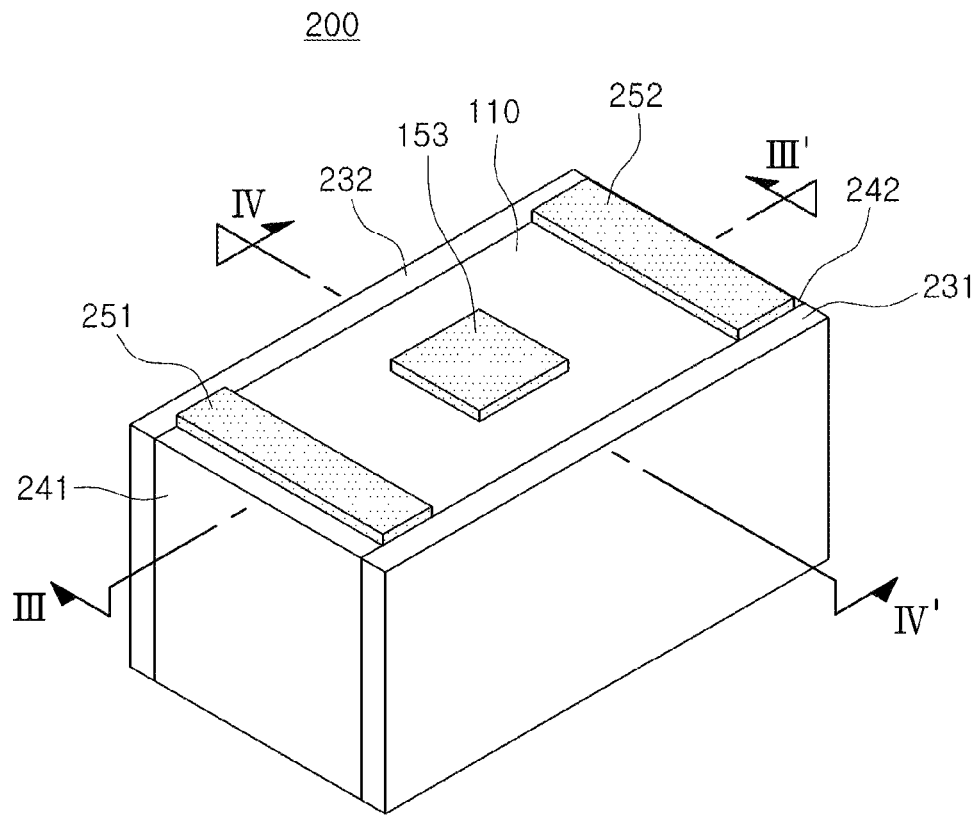
FIG. 11 is a schematic perspective view schematically illustrating a capacitor component according to another exemplary embodiment in the present disclosure.

FIG. 11 is a schematic perspective view schematically illustrating a capacitor component according to another exemplary embodiment in the present disclosure.

Figure 12:
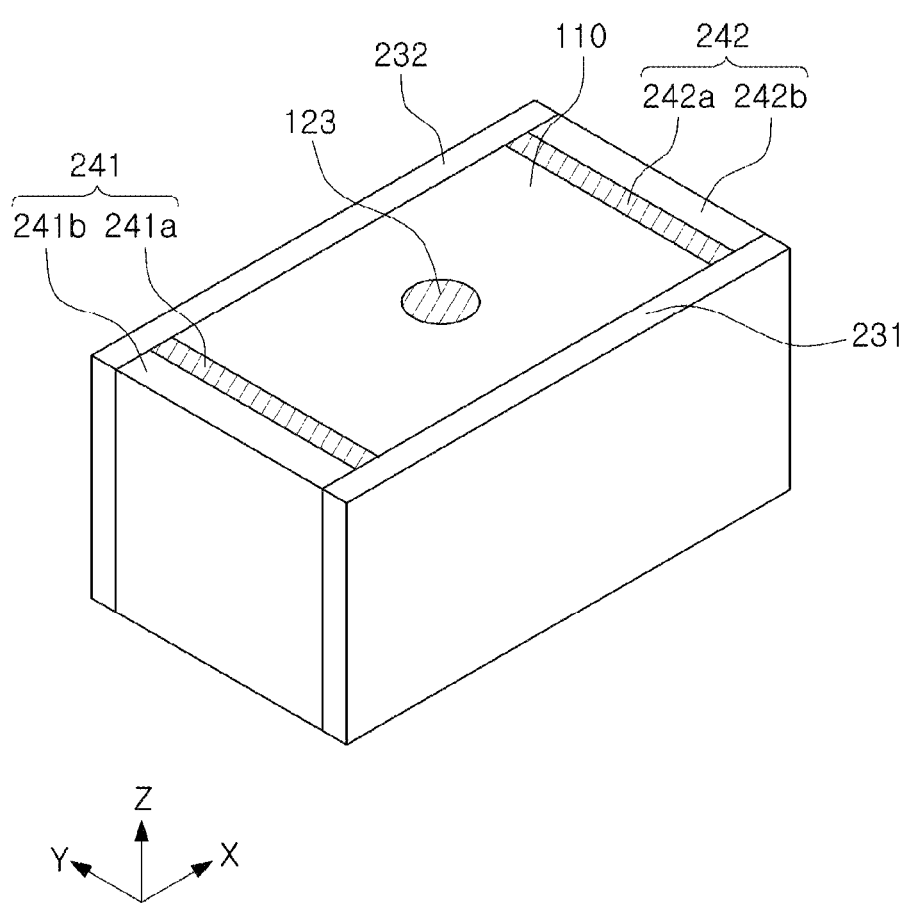
FIG. 12 is a perspective view illustrating the capacitor component of FIG. 11 from which first to third external electrodes are excluded.

FIG. 12 is a perspective view illustrating the capacitor component of FIG. 11 from which first to third external electrodes are excluded.

Figure 13:
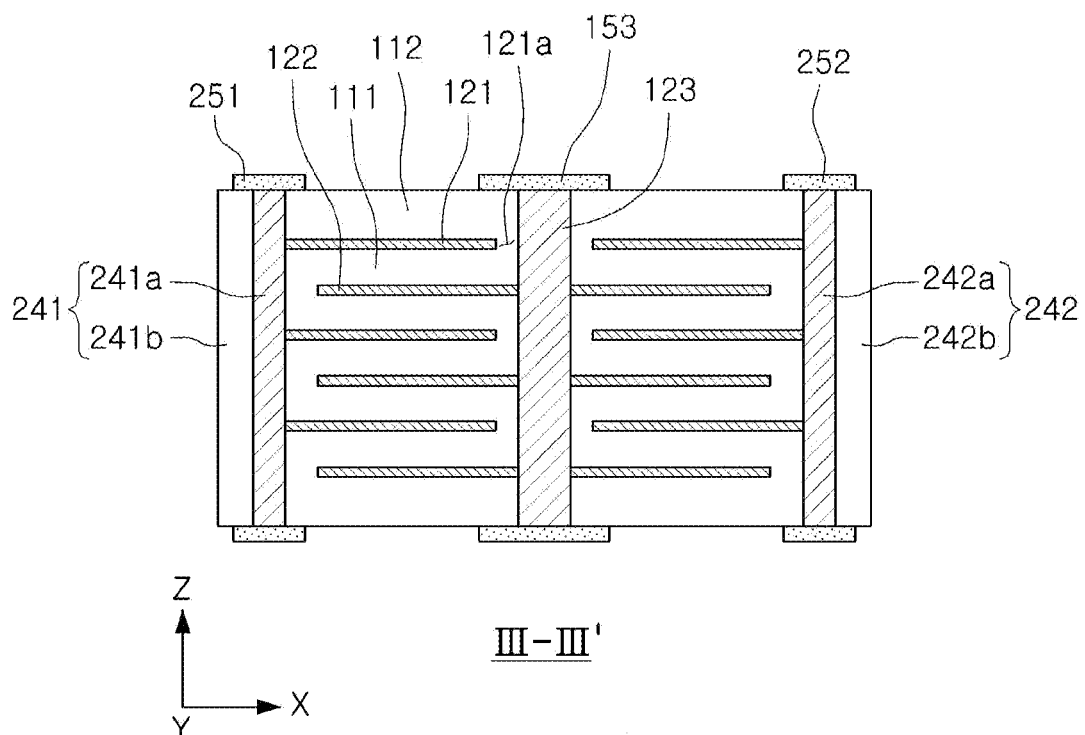
FIG. 13 is a cross-sectional view taken along line III-III' of FIG. 11.

FIG. 13 is a cross-sectional view taken along line III-III' of FIG. 11.

Figure 14:
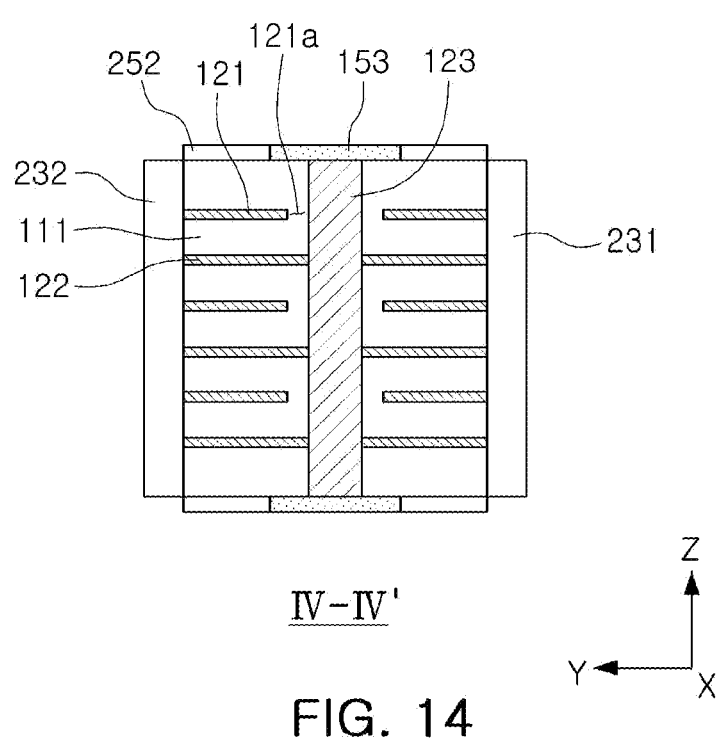
FIG. 14 is a cross-sectional view taken along line IV-IV' of FIG. 11.

FIG. 14 is a cross-sectional view taken along line IV-IV' of FIG. 11.

Figure 15A:
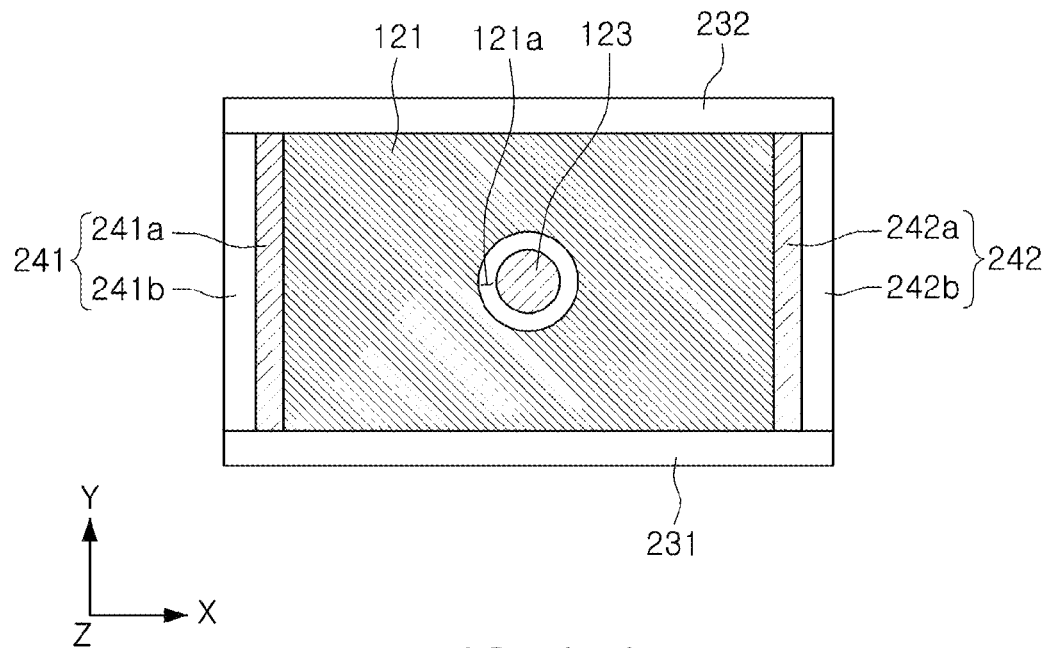
FIGS. 15A and 15B are cross-sectional views taken in X and Y directions of FIG. 11, where
Figure 15B:
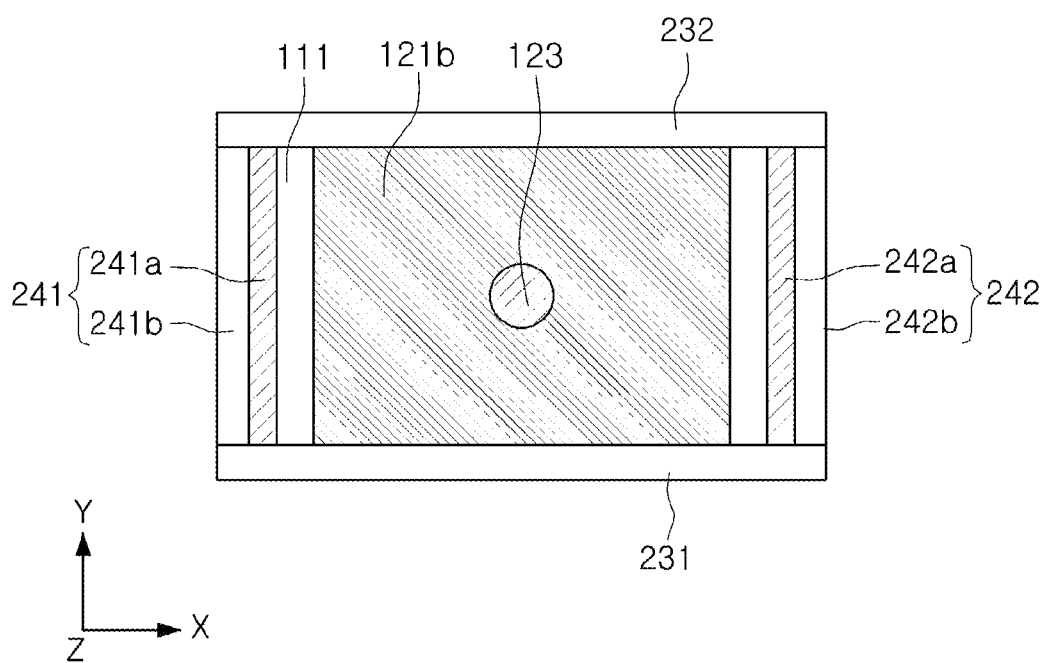

FIGS. 15A and 15B are cross-sectional views taken in X and Y directions of FIG. 11, where FIG. 15A illustrates a cross section from which a first internal electrode is observed and FIG. 15B illustrates a cross section from which a second internal electrode is observed.

Hereinafter, a capacitor component 200 according to another exemplary embodiment in the present disclosure will be described in detail with referent to FIGS. 11 through 15B. However, the description overlapped with the capacitor component according to an exemplary embodiment in the present disclosure will be omitted.

In the capacitor component 200 according to another exemplary embodiment in the present disclosure, a first margin portion 231 may be disposed to cover one surface of each of the first and second connection parts 241 and 242 in the Y direction (third direction), and a second margin portion 232 may be disposed to cover the other surface of the first and second connection parts 241 and 242 in the Y direction (third direction).

By forming the first and second margin portions 231 and 232 on the body on which the first and second connection parts 241 and 242 are formed after the first and second connection parts 241 and 242 are formed on the body 110 using the method of transferring the sheets described above, the first margin portion 231 may be disposed to cover one surface of each of the first and second connection parts 241 and 242 in the Y direction (third direction), and the second margin portion 232 may be disposed to cover the other surface of the first and second connection parts 241 and 242 in the Y direction (third direction).

In addition, the first connection part 241 may be disposed within a range that does not deviate from the third surface 3 and the second connection part 242 may be disposed within a range that does not deviate from the fourth surface 4. In addition, the first connection part 241 may have a shape and size corresponding to the third surface 3 and the second connection part 242 may have a shape and size corresponding to the fourth surface 4.

On the other hand, by also forming the first and second margin portions 231 and 232 using the method of transferring the sheets described above, the first margin portion 231 may be disposed within a range that does not deviate from the fifth surface 5 and one surface of each of the first and second connection parts 241 and 242 in the third direction, and the second margin portion 232 may be disposed within a range that does not deviate from the sixth surface 6 and the other surface of each of the first and second connection parts 241 and 242 in the third direction. In addition, the first margin portion 231 may have a shape and size corresponding to a summed surface of the fifth surface 5 and one surface of each of the first and second connection parts 241 and 242 in the third direction, and the second margin portion 232 may have a shape and size corresponding to a summed surface of the sixth surface 6 and the other surface of each of the first and second connection parts 241 and 242 in the third direction.

In addition, since metal layers 241a and 242a are not exposed in a width direction (Y direction) of the capacitor component, first and second external electrodes 251 and 252 may be formed on one surface or opposite surfaces of each of the first and second connection parts 241 and 242 in the first direction. Therefore, since the first and second external electrodes 251 and 252 are not formed on opposite surfaces of the capacitor component in the width direction, the width of the capacitor component may be significantly reduced, and a capacitance per unit volume of the capacitor component may be improved.

As set forth above, according to the exemplary embodiments in the present disclosure, as the capacitor component has the structure in which the first and second external electrodes are connected to the first internal electrode through the connection part and the third external electrode is connected to the second internal electrode through the connection electrode penetrating through the body, the capacitance per unit volume may be improved, and the number of the current paths may be reduced to lower the equivalent series inductance (ESL). In addition, the substrate mounting area of the capacitor component may be reduced.

However, various advantages and effects of the present disclosure are not limited to the description above, and may be more readily understood in the description of exemplary embodiments in the present disclosure.

While exemplary embodiments have been shown and described above, it will be apparent to those skilled in the art that modifications and variations could be made without departing from the scope of the present invention as defined by the appended claims.

What is claimed is:

1. A capacitor component comprising:
   a body including a dielectric layer and first and second internal electrodes disposed to face each other in a first direction of the body while having the dielectric layer interposed therebetween, and including first and second surfaces opposing each other in the first direction, third and fourth surfaces connected to the first and second surfaces and opposing each other in a second direction of the body, and fifth and sixth surfaces connected to the first to fourth surfaces and opposing each other in a third direction of the body;
   first and second margin portions disposed on the fifth and sixth surfaces, respectively;
   first and second connection parts disposed on the third and fourth surfaces, respectively, and including metal layers connected to the first internal electrode and ceramic layers disposed on the metal layers;
   a connection electrode penetrating through the body in the first direction and connected to the second internal electrode;
   a first external electrode disposed on one surface of the first connection part in the first direction;
   a second external electrode disposed on one surface of the second connection part in the first direction; and
   a third external electrode disposed on the body and connected to the connection electrode,
   wherein the first and second margin portions are composed of a material composition different from that of the dielectric layer, and
   the ceramic layers are composed of a material composition different from that of the dielectric layer.

2. The capacitor component of claim 1, wherein the first connection part covers one surface of each of the first and second margin portions in the second direction, and
   the second connection part covers the other surface of each of the first and second margin portions in the second direction.

3. The capacitor component of claim 2, wherein the first connection part is disposed within a range that does not deviate from the third surface and the one surface of each of the first and second margin portions in the second direction, and
   the second connection part is disposed within a range that does not deviate from the fourth surface and the other surface of each of the first and second margin portions in the second direction.

4. The capacitor component of claim 1, wherein one surface of each of the first and second connection parts in the third direction is disposed on the same plane as one surface of the first margin portion, and
   the other surface of each of the first and second connection parts in the third direction is disposed on the same plane as one surface of the second margin portion.

5. The capacitor component of claim 1, wherein one surface of each of the first and second margin portions and the first and second connection parts in the first direction is disposed on the same plane as the first surface, and the other surface of each of the first and second margin portions and the first and second connection parts in the first direction is disposed on the same plane as the second surface.

6. The capacitor component of claim 1, wherein the first internal electrode is in contact with the third to sixth surfaces of the body, and the second internal electrode is in contact with the fifth and sixth surfaces of the body.

7. The capacitor component of claim 1, wherein the connection electrode is spaced apart from the first internal electrode by an insulating part which the first internal electrode penetrates through.

8. The capacitor component of claim 7, wherein the first internal electrode includes lead parts in contact with the third and fourth surfaces, respectively, and a length of each of the lead parts in the third direction is smaller than a length of the body in the third direction.

9. The capacitor component of claim 1, wherein the first margin portion has a shape and size corresponding to the fifth surface, and the second margin portion has a shape and size corresponding to the sixth surface.

10. The capacitor component of claim 1, wherein a ratio of a minimum value to a maximum value of a thickness of one of the first and second connection parts is 0.9 to 1.0.

11. The capacitor component of claim 1, wherein a thickness of one of the metal layers is 1 to 5 μm.

12. The capacitor component of claim 1, wherein a thickness of one of the ceramic layers is 1 to 25 μm.

13. The capacitor component of claim 1, wherein a ratio of a minimum value to a maximum value of a width, in the third direction, of one of the first and second margin portions is 0.9 to 1.0.

14. The capacitor component of claim 1, wherein a width, in the third direction, of one of the first and second margin portions is 5 to 30 μm.

15. The capacitor component of claim 1, wherein a length of the capacitor component is 0.6 mm or less, and a width of the capacitor component is 0.3 mm or less.

16. The capacitor component of claim 1, wherein the first external electrode is disposed on opposite surfaces of the first connection part in the first direction and opposite surfaces of the first connection part in the third direction, and the second external electrode is disposed on opposite surfaces of the second connection part in the first direction and opposite surfaces of the second connection part in the third direction.

17. The capacitor component of claim 1, wherein the ceramic layers include an organic material component having a weight ratio with respect to a total weight of the ceramic layers greater than a weight ratio of an organic material component included in the dielectric layer with respect to a total weight of the dielectric layer.

18. The capacitor component of claim 1, wherein the first and second margin portions are formed by transferring dielectric sheets onto the body in the third direction.

19. The capacitor component of claim 1, wherein the first and second connection parts are formed by transferring a sheet shaped ceramic layer and a sheet shaped metal layer in the second direction.

20. The capacitor component of claim 1, wherein the first and second margin portions include an organic material component having a weight ratio with respect to a total weight of the first and second margin portions greater than a weight ratio of an organic material component included in the dielectric layer with respect to a total weight of the dielectric layer.

21. A capacitor component comprising:
a body including a dielectric layer and first and second internal electrodes disposed to face each other in a first direction of the body while having the dielectric layer interposed therebetween, and including first and second surfaces opposing each other in the first direction, third and fourth surfaces connected to the first and second surfaces and opposing each other in a second direction of the body, and fifth and sixth surfaces connected to the first to fourth surfaces and opposing each other in a third direction of the body;

first and second margin portions disposed on the fifth and sixth surfaces, respectively;

first and second connection parts disposed on the third and fourth surfaces, respectively, and including metal layers connected to the first internal electrode and ceramic layers disposed on the metal layers;

a connection electrode penetrating through the body in the first direction and connected to the second internal electrode;

a first external electrode disposed on one surface of the first connection part in the first direction;

a second external electrode disposed on one surface of the second connection part in the first direction; and a third external electrode disposed on the body and connected to the connection electrode, wherein the first margin portion covers one surface of each of the first and second connection parts in the third direction, and the second margin portion covers the other surface of each of the first and second connection parts in the third direction.

22. The capacitor component of claim 21, wherein the first connection part is disposed within a range that does not deviate from the third surface, and the second connection part is disposed within a range that does not deviate from the fourth surface.

23. The capacitor component of claim 21, wherein the first connection part has a shape and size corresponding to the third surface, and the second connection part has a shape and size corresponding to the fourth surface.

24. The capacitor component of claim 21, wherein the first margin portion is disposed within a range that does not deviate from the fifth surface and one surface of each of the first and second connection parts in the third direction, and the second margin portion is disposed within a range that does not deviate from the sixth surface and the other surface of each of the first and second connection parts in the third direction.

25. The capacitor component of claim 21, wherein the first external electrode is disposed only on one or more surfaces of the first connection part in the first direction, and the second external electrode is disposed only on one or more surfaces of the second connection part in the first direction.

26. A capacitor component comprising:
a body including a dielectric layer and first and second internal electrodes disposed to face each other in a first direction of the body while having the dielectric layer interposed therebetween, and including first and second surfaces opposing each other in the first direction, third and fourth surfaces connected to the first and second surfaces and opposing each other in a second direction of the body, and fifth and sixth surfaces connected to the first to fourth surfaces and opposing each other in a third direction of the body, wherein the first internal electrode is in contact with the third to sixth surfaces;

first and second margin portions disposed on the fifth and sixth surfaces and being in contact with the first internal electrode, respectively;

a first connection part disposed on the third surface, and including a first metal layer connected to the first internal electrode and a first ceramic layer disposed on the first metal layer;

a second connection part disposed on the fourth surface, and including a second metal layer connected to the first internal electrode and a second ceramic layer disposed on the second metal layer;

a connection electrode penetrating through the body in the first direction and connected to the second internal electrode;

a first external electrode connected to the first metal layer;

a second external electrode connected to the second metal layer; and a third external electrode disposed between the first and second external electrodes and connected to the connection electrode, wherein each of the first and second margin portions is in contact with the first and second metal layers, the first and second margin portions are composed of a material composition different from that of the dielectric layer, and the first and second ceramic layers are composed of a material composition different from that of the dielectric layer.

27. The capacitor component of claim 26, wherein the third external electrode is disposed on one of the first and second surfaces, the first metal layer has outer surfaces covered by the first external electrode, and the second metal layer has outer surfaces covered by the second external electrode.

28. The capacitor component of claim 27, wherein the outer surfaces of the first metal layer are covered directly by the first external electrode, and the outer surfaces of the second metal layer are covered directly by the second external electrode.

29. The capacitor component of claim 27, wherein the outer surfaces of the first metal layer include a first pair in the first direction covered directly by the first external electrode, and a second pair in the third direction covered directly by the first and second margin portions, and the outer surfaces of the second metal layer include a first pair in the first direction covered directly by the second external electrode, and a second pair in the third direction covered directly by the first and second margin portions.

30. The capacitor component of claim 26, wherein the third external electrode is disposed on one of the first and second surfaces, the first external electrode is spaced apart from an outer end surface of the first ceramic layer in the second direction, and the second external electrode is spaced apart from an outer end surface of the second ceramic layer in the second direction.

31. The capacitor component of claim 26, wherein a ratio of a minimum value to a maximum value of a width, in the third direction, of one of the first and second margin portions is 0.9 to 1.0.

32. A capacitor component comprising:

a body including a dielectric layer and first and second internal electrodes disposed to face each other in a first direction of the body while having the dielectric layer interposed therebetween, and including first and second surfaces opposing each other in the first direction, third and fourth surfaces connected to the first and second surfaces and opposing each other in a second direction of the body, and fifth and sixth surfaces connected to the first to fourth surfaces and opposing each other in a third direction of the body;

first and second margin portions disposed on the fifth and sixth surfaces, respectively;

first and second connection parts disposed on the third and fourth surfaces, respectively, and including metal layers connected to the first internal electrode and ceramic layers disposed on the metal layers;

a connection electrode penetrating through the body in the first direction and connected to the second internal electrode;

a first external electrode disposed on one surface of the first connection part in the first direction;

a second external electrode disposed on one surface of the second connection part in the first direction; and a third external electrode disposed on the body and connected to the connection electrode, wherein the ceramic layers include an organic material component having a weight ratio with respect to a total weight of the ceramic layers greater than a weight ratio of an organic material component included in the dielectric layer with respect to a total weight of the dielectric layer.

33. The capacitor component of claim 32, wherein the ceramic layers include the same ceramic material as that included in the dielectric layer.

34. The capacitor component of claim 26, wherein the first and second ceramic layers include the same ceramic material as that included in the dielectric layer.

35. The capacitor component of claim 1, wherein the ceramic layers include the same ceramic material as that included in the dielectric layer.

* * * * *